No. 844,027. PATENTED FEB. 12, 1907.
J. E. KIRBERG.
MACHINE FOR MAKING BRAIDS AND TRIMMINGS.
APPLICATION FILED AUG. 2, 1905.
6 SHEETS—SHEET 1.
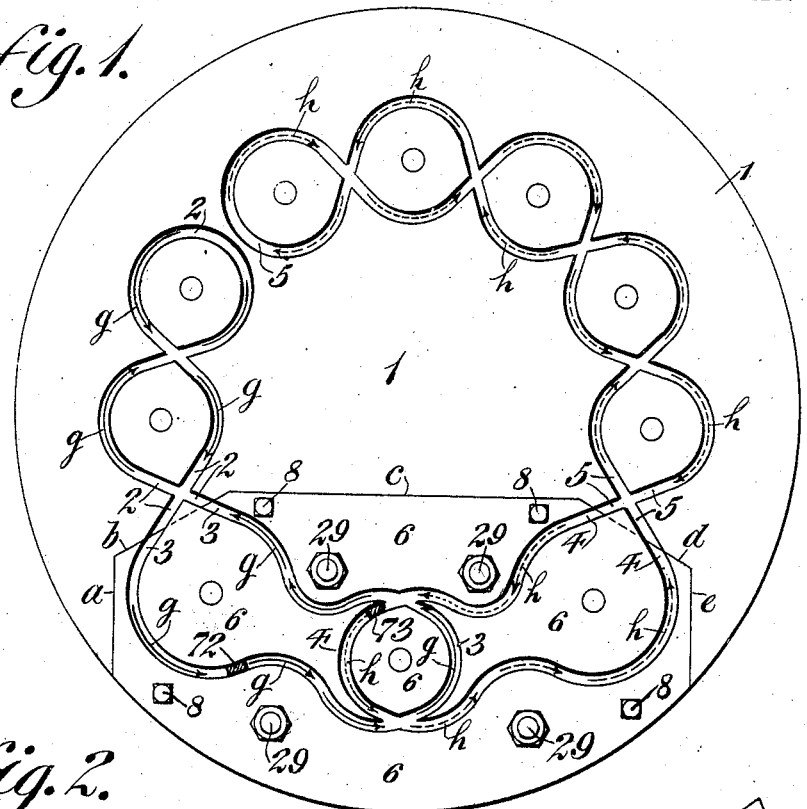
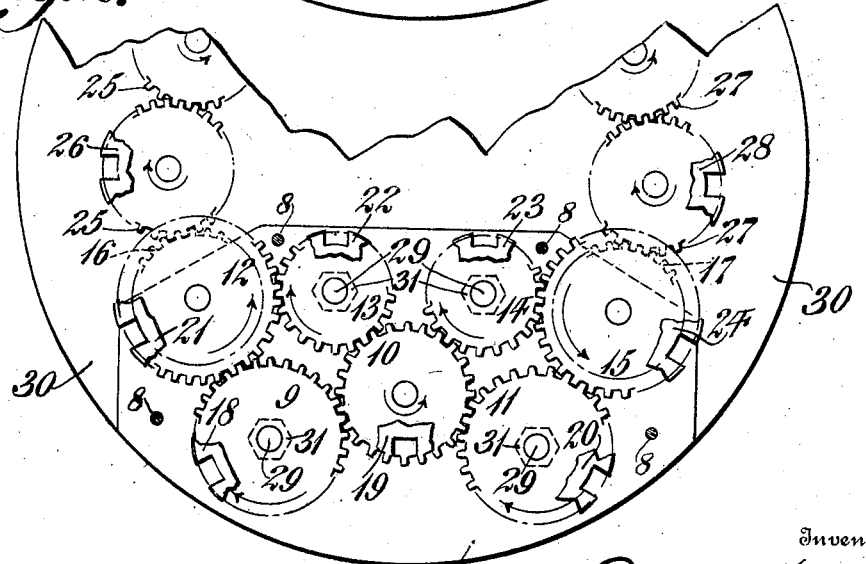
Witnesses
L. Rouville
O. F. Nagle
Inventor
Jacob E. Kirberg
By Diedersheim & Fairbanks
Attorneys No. 844,027. PATENTED FEB. 12, 1907.
J. E. KIRBERG.
MACHINE FOR MAKING BRAIDS AND TRIMMINGS.
APPLICATION FILED AUG. 2, 1905.

6 SHEETS—SHEET 2.

Witnesses
L. Douville,
P. F. Nagle.

Inventor
Jacob E. Kirberg,
By Biedersheim & Fairbanks,
Attorneys

No. 844,027. PATENTED FEB. 12, 1907.
J. E. KIRBERG.
MACHINE FOR MAKING BRAIDS AND TRIMMINGS.
APPLICATION FILED AUG. 2, 1905.
6 SHEETS—SHEET 3.
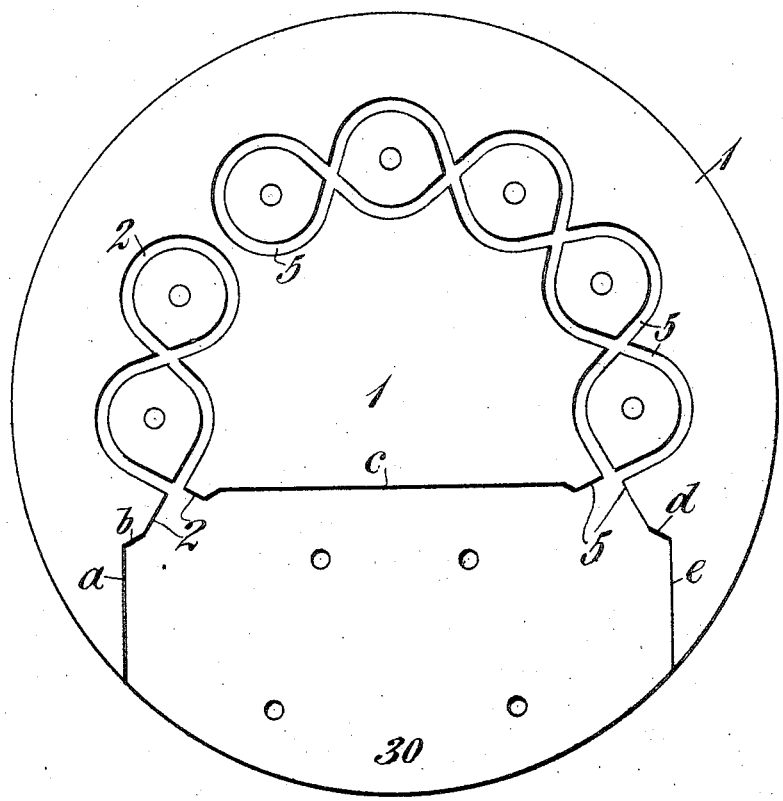

No. 844,027. PATENTED FEB. 12, 1907.
J. E. KIRBERG.
MACHINE FOR MAKING BRAIDS AND TRIMMINGS.
APPLICATION FILED AUG. 2, 1905.
6 SHEETS—SHEET 4.
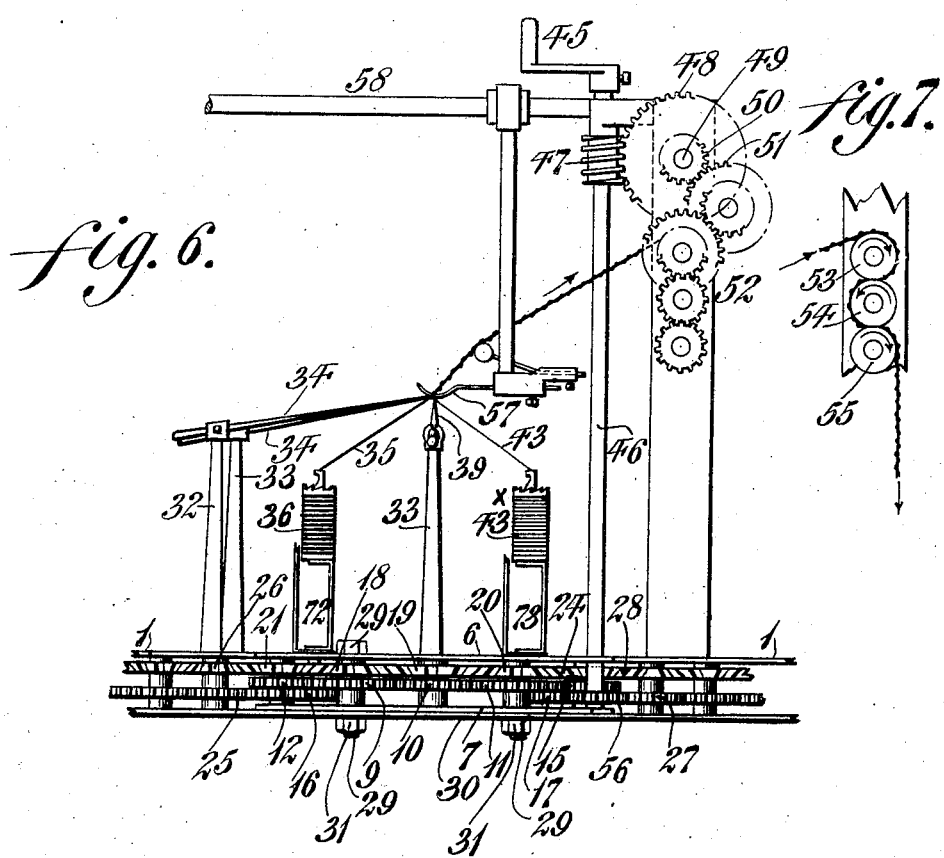

No. 844,027. PATENTED FEB. 12, 1907.
J. E. KIRBERG.
MACHINE FOR MAKING BRAIDS AND TRIMMINGS.
APPLICATION FILED AUG. 2, 1905.
6 SHEETS—SHEET 5.
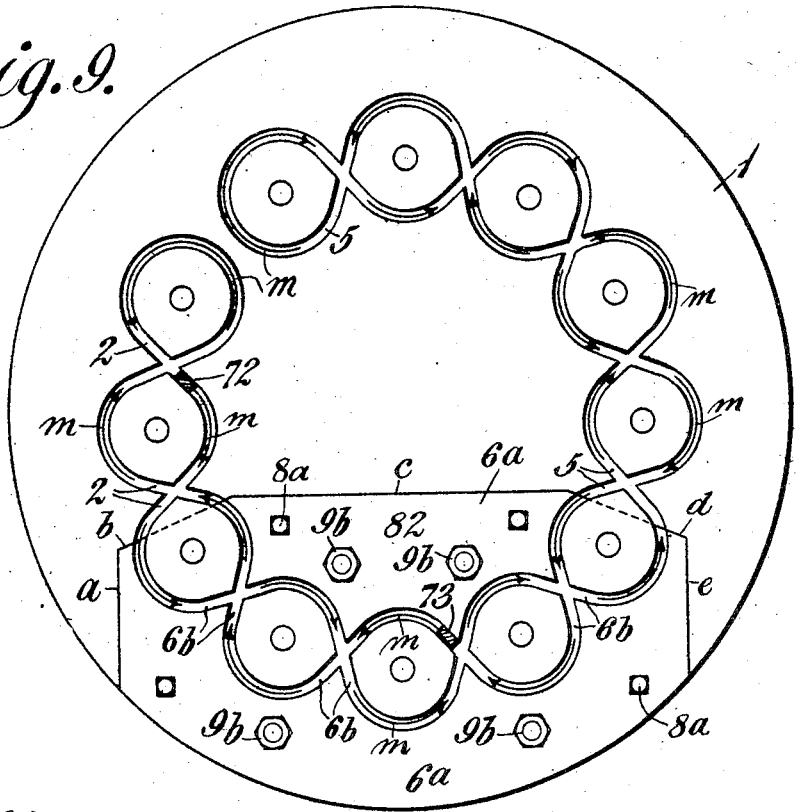
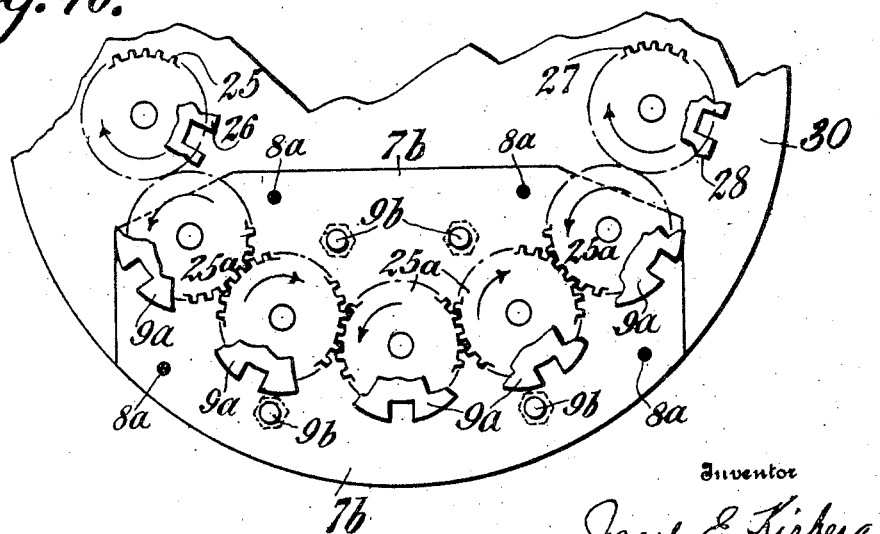

No. 844,027. PATENTED FEB. 12, 1907.
J. E. KIRBERG.
MACHINE FOR MAKING BRAIDS AND TRIMMINGS.
APPLICATION FILED AUG. 2, 1905.

6 SHEETS—SHEET 6.

Witnesses
Inventor
Jacob E. Kirberg.

UNITED STATES PATENT OFFICE.

JACOB E. KIRBERG, OF PHILADELPHIA, PENNSYLVANIA, ASSIGNOR TO HENSEL COLLADAY COMPANY, A CORPORATION OF PENNSYLVANIA.

MACHINE FOR MAKING BRAIDS AND TRIMMINGS.

No. 844,027.      Specification of Letters Patent.      Patented Feb. 12, 1907.

Application filed August 2, 1905. Serial No. 272,366.

*To all whom it may concern:*

Be it known that I, JACOB E. KIRBERG, a citizen of the United States, residing in the city and county of Philadelphia, State of Pennsylvania, have invented a new and useful Improvement in Machines for Making Braids and Trimmings, which improvement is fully set forth in the following specification.

My invention relates to improvements in machines for making braids and trimmings, and consists of means whereby a machine for making plain braids and trimmings may be readily converted into one for making figured work, so that, if desired, a combination of plain and figured effects can be introduced into the braid or trimmings.

It further consists in so constructing the attachment which constitutes my invention that the same, which consists of a frame provided with a train of gearing and slotted heads or wings, may be applied to and removed from a machine as a whole or single member.

Figure 3:
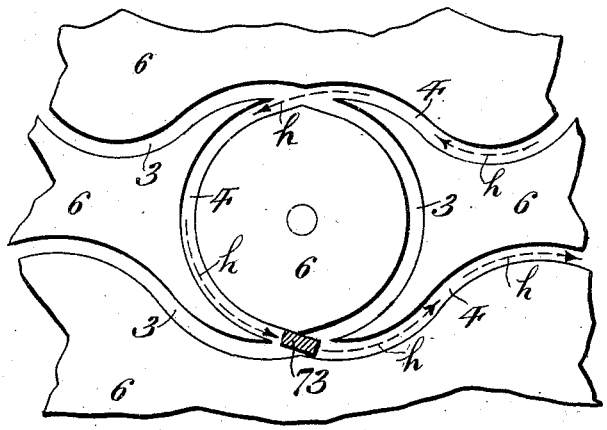
Figure 4:
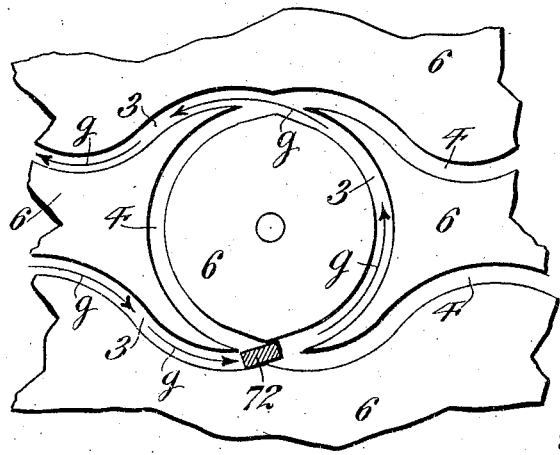
Figure 11:
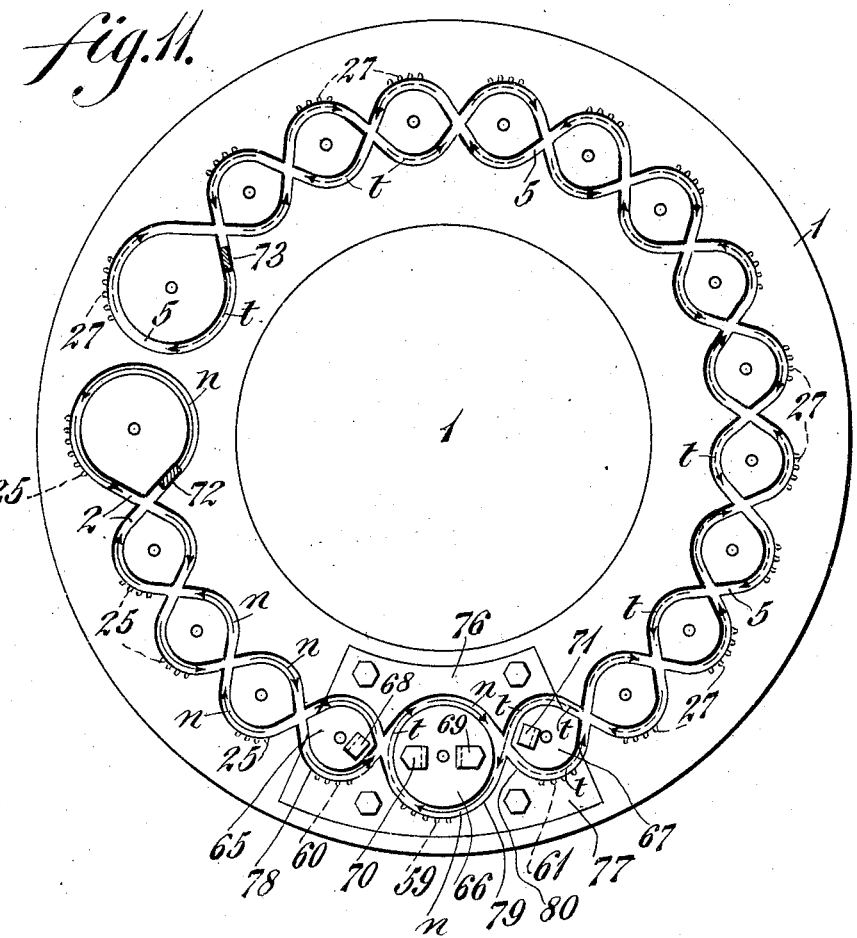
Figure 12:
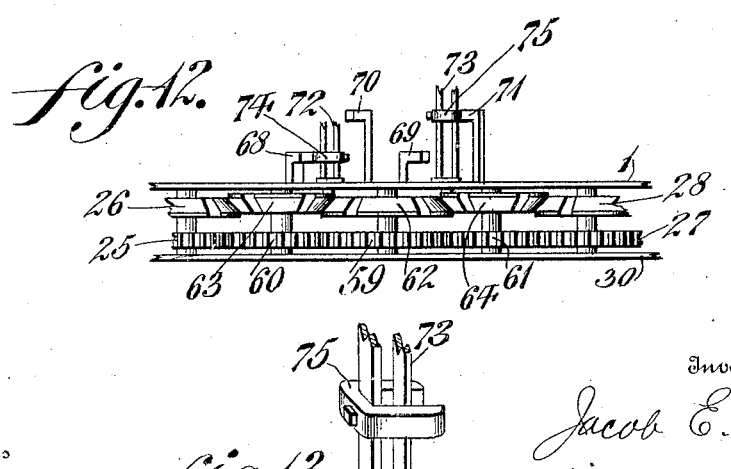
Figure 13:
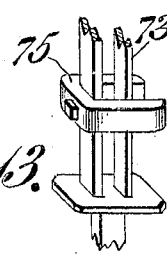

Figure 1 represents a plan view of a portion of a machine for making braids and trimmings with certain parts of my invention applied thereto. Fig. 2 represents a plan view of a portion of the gearing employed. Figs. 3 and 4 represent plan views of certain detached portions of the device on an enlarged scale. Fig. 5 represents a plan view of certain of the parts seen in Fig. 1. Fig. 6 represents a side elevation of a portion of a machine for making braids and trimmings with my invention applied thereto, the same being on a reduced scale. Fig. 7 represents an end elevation of the take-up rollers. Fig. 8 represents a view of a braid or trimming which may be produced by my invention. Figs. 9 and 10 represent plan views of portions of a machine for making plain work. Fig. 11 represents a plan view of a modification of the attachment seen in Fig. 1. Fig. 12 represents an elevation of certain portions of the device seen in Fig. 11. Fig. 13 represents a perspective view of certain of the parts seen in Fig. 12.

Similar numerals of reference indicate corresponding parts in the figures.

Referring to the drawings, in Fig. 1, 1 designates the top plate of a braid-machine in which are the race-rings 2, 3, 4, and 5. The top plate 1 has a portion thereof which has been removed—as, for instance, along the lines *a b c d e* (see also Figs. 5 and 9)—said space being adapted to receive the top plate 6 of my device, whose inner edges or contour coincide with the walls of the portion of the top plate 1 along the lines *a b c d e*, it being noted that where the race-slots 3 meet the line *b* they register with the slots 2 in the plate 1, so as to form a continuous course between both sets of race-slots 2 and 3. The race-slots 4 register with the slots 5 where they meet on the line *d*, so as to form a continuous course between both sets of slots 4 and 5. The top plate 6 is secured to the bottom plate 7 (see Figs. 2 and 6) by bolts or their equivalents 8.

Sufficient space exists between the plates 6 and 7 to receive the gear-wheels 9 to 17, both inclusive, and also the slotted heads or wings 18 to 24, both inclusive. The gear-wheel 16 meshes with a gear-wheel 25, which is one in a train of gearing which belongs to the system of race-slots 2 and 3 and which may be of any desired number of wheels. The gear-wheel 25 imparts motion to the slotted head or wing 26. The gear-wheel 17 meshes with a gear-wheel 27, which is one in a train of gearing which belongs to the system of race-slots 4 and 5 and which may be of any desired number of wheels. The gear-wheel 27 imparts motion to the slotted head or wing 28.

The bolts 29 serve a twofold object—viz., a mounting for the gear-wheels 9, 11, 13, and 14 and their respective wings or slotted heads 18, 20, 22, and 23, and furthermore serve to firmly secure the framework, composed of the plates 6 and 7, to the bottom plate 30 of the machine and upon which rests said plate 7, as seen in Fig. 6, it being noted that the nuts 31 serve to clamp the plates 7 and 30 together, so as to make a rigid structure of the two.

32 and 33 designate needle-posts, each of which is provided with a needle 34, around one of which the yarn 35 from the bobbin 36, supported in a racer 72, is passed to form the loops 37 on one of the edges of the braid or trimming 38. (Seen in Fig. 8.) The yarn 35 is also passed around the needle 39 to form the loops 40, which interlace with the body portion 41 of the braid or trimming 38 along the line 42.

The yarn 43 from the bobbin $43^\times$, supported in a racer 73, is passed around one of the needles 34 and forms the loops 44 on the outer edge of the body portion 41 of the braid or trimming 38.

45 designates a crank for operating the shaft 46, which is provided with a worm 47 which engages with a worm-wheel 48, on whose shaft 49 is a gear-wheel 50, which meshes with a gear-wheel 51, which forms part of a train of gearing 52, which operates the take-up rolls 53, 54, and 55 in the usual manner. The shaft 46 has secured thereon a gear-wheel 56, which meshes with the gear-wheel 17 for a purpose hereinafter described.

57 designates a yarn-guide supported from a rod 58 in the usual manner.

In Figs. 9 and 10 I illustrate an attachment for making plain braid or trimmings, it being noted that the top plate $6^a$ has a series of race-slots $6^b$, which are adapted to register with the race-slots 2 and 5 when said plate $6^a$ is placed in the machine. $7^b$ designates a bottom plate which is secured to the top plate $6^a$ by bolts $8^a$, it being understood that sufficient space exists between both of said plates to receive a train of gears $25^a$, which mesh with the gear-wheels 25 and 27 hereinbefore referred to. The gear-wheels $25^a$ operate the slotted heads or wings $9^a$.

In the modification illustrated in Fig. 11 I employ the gear-wheels 59, 60, and 61, which impart motion to their respective slotted heads or wings 62, 63, and 64 and which mesh with the usual train of gearing, consisting of the wheels 25 and 27.

The plates 65, 66, and 67 have secured thereto the guides or deflectors 68, 69, 70, and 71 for a purpose hereinafter described. The yarn carriers or racers consist of two sets. One of the carriers belonging to one of the sets is indicated by 72, and the carrier belonging to the other set is indicated by 73. The yarn-carriers in one set are each provided with a collar 74, and those in the other set are each provided with a collar 75 for a purpose hereinafter described. The plates 65, 66, 67, 76, and 77 are so shaped that they produce the race-slots 78, 79, and 80, which are employed in connection with the race-slots 2 and 5.

The operation is as follows: When it is desired to produce a figured braid or trimming of the class described in connection with Fig. 8, I place the attachment consisting of the plates 6 and 7 and parts carried thereby in the machine and secure said attachment thereto by the nuts 31, which are fitted on the bolts 29. The yarn 35 and 43 from any desired number of bobbins 36 and $43^×$, respectively, are then led to the needles 34 and 39 and guide 57 in the usual manner, so that the braid is formed when the machine is put in operation, which can be done by turning the crank 45, which imparts motion to the gear-wheel 56, which drives the other gear-wheels throughout the system, although it will be understood that the machine is also adapted to be driven by other than hand-power and in the usual manner in machines of this class. The braid or trimming 38 is led from the guide 57 to the take-up rolls 53, 54, and 55 in the usual manner. The series of yarn carriers or racers 72 are caused to travel in the slots 2 and 3 and follow the course indicated by the arrows $g$ in Fig. 1, while the series of racers 73 are caused to travel in the slots 4 and 5 and follow the course indicated by the arrows $h$ in said figure. When it is desired to produce a plain braid or trimming, the nuts 31 are removed from the bolts 29, whereupon the attachment consisting of the plates 6 and 7 and parts carried thereby is removed as a whole or single structure from the machine, and the attachment consisting of the plates $6^a$ and $7^b$ and parts carried thereby is substituted therefor and secured in position by bolts $9^b$, as seen in Fig. 9. The racers 72 and 73 in this arrangement follow the course indicated by the arrows $m$ in said figure.

In the device illustrated in Fig. 11 the racers 72 travel in the slots 2, 78, and 79 and follow the course indicated by the arrows $n$ in said figure, it being understood that said racers are deflected by the guides 68 and 69, against which the collars 74 on said racers contact at certain times during their travel.

The racers 73 (seen in Fig. 11) travel in the slots 5, 79, and 80 and follow the course indicated by the arrows $t$ and are deflected by the guides 70 and 71, with which the collars 75 on said racers contact at certain times during their travel. This device will also produce a figured braid or trimming of the class described in connection with Fig. 8.

When it is desired to produce a plain braid or trimming, the plates 65, 66, 67, 76, and 77, and also the gear-wheels 59, 60, and 61, with their respective wings 62, 63, and 64, are removed from the machine, after which gears, wings, and plates adapted for plain work are substituted therefor, which will cause both sets of racers 72 and 73 to travel over the same course, which is substantially the same as that described in connection with Fig. 9.

It is to be especially noted that in my construction I remove a portion of the race-ring intermediate the ends thereof and that the construction or arrangement of the end gears of the train which produce the selvage is not changed in any manner.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In a braiding-machine, the frame having a raceway therein, said raceway having an intermediate removable section, racers for said raceway, means for actuating said racers, said removable section having a portion of a raceway therein forming a plurality of separate intersecting race-rings.

2. In a braiding-machine, the frame having a raceway therein, said raceway having an intermediate removable section having a portion of a raceway therein forming with the raceway of the frame a plurality of separate intersecting race-rings, racers for said race-rings and means for causing each racer to travel in its respective race-ring.

3. In a braiding-machine, the frame having a raceway therein, said raceway having an intermediate removable section having a portion of a raceway therein forming with the raceway of the frame a plurality of separate intersecting race-rings, racers for said race-rings and means carried by the removable section coacting with said racers to cause each racer to travel in its respective race-ring.

4. In a braiding-machine, a frame having a continuous raceway therein, said raceway having an intermediate removable section provided with portions of separate intersecting race-rings, racers for said race-rings, collars carried by said racers and guides carried by said replacing-section adapted to engage said collars to vary the direction of said racers.

5. In a braiding-machine, a frame having a raceway therein, said raceway having an intermediate removable section provided with intersecting raceways coacting with the raceways of the frame to form a plurality of separate continuous and intersecting race-rings, sets of racers for said race-rings, and means for deflecting each set of racers into its respective race-rings.

6. In a braiding-machine, a frame having a raceway therein, said raceway having an intermediate removable section having a plurality of portions of raceways therein intersecting at diametrically opposite points to form, with the raceways of the frame, a plurality of separate continuous and intersecting race-rings, sets of racers for said race-rings, and means for causing each set of racers to travel in its respective race-ring.

7. In a braiding-machine, a frame having a continuous raceway therein, said raceway having an intermediate removable section provided with portions of intersecting raceways registering with the raceways of said frame to form a plurality of separate continuous and intersecting race-rings, sets of racers for said race-rings and guides carried by the replacing section coacting with said sets to cause each to travel in its respective race-ring.

8. In a braiding-machine, a mutilated frame having a raceway therein, incomplete intermediate its ends, and a removable section for said frame having portions of a raceway therein adapted to coöperate with the raceway of the frame.

JACOB E. KIRBERG.

Witnesses:
WM. CANER WIEDERSEIM,
C. D. McVAY.